United States Patent
Ozawa et al.

(10) Patent No.: US 6,945,568 B2
(45) Date of Patent: Sep. 20, 2005

(54) JOINT STRUCTURE FOR COUPLING COMPONENTS IN A JOINT PORTION OF A FLUID FLOW PASSAGE

(75) Inventors: Toshihiko Ozawa, Saitama (JP); Takashi Imai, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 0 days.

(21) Appl. No.: 10/285,479

(22) Filed: Nov. 1, 2002

(65) Prior Publication Data

US 2003/0081990 A1 May 1, 2003

(30) Foreign Application Priority Data

Nov. 1, 2001 (JP) ........................................ 2001-336607

(51) Int. Cl.[7] .............................................. F16L 13/02
(52) U.S. Cl. ................................ 285/288.6; 285/288.5; 285/331
(58) Field of Search ............................. 285/331, 288.5, 285/288.6

(56) References Cited

U.S. PATENT DOCUMENTS

| | | | | |
|---|---|---|---|---|
| 1,474,586 A | * | 11/1923 | Hanrahan | 285/331 |
| 2,284,216 A | * | 5/1942 | Kunkel | 285/331 |
| 4,099,706 A | * | 7/1978 | Steele et al. | 251/367 |
| 5,348,354 A | * | 9/1994 | Badoureaux | 285/308 |
| 5,636,875 A | * | 6/1997 | Wasser | 285/21.1 |
| 5,685,571 A | * | 11/1997 | Gardner | 285/12 |
| 5,997,049 A | * | 12/1999 | Kingsford et al. | 285/331 |
| 6,089,620 A | * | 7/2000 | Mota Lopez et al. | 285/322 |
| 6,450,543 B1 | * | 9/2002 | Fukano et al. | 285/21.1 |
| 6,536,810 B2 | * | 3/2003 | Fukano et al. | 285/328 |

* cited by examiner

*Primary Examiner*—James M. Hewitt
(74) *Attorney, Agent, or Firm*—Browdy and Neimark, P.L.L.C.

(57) ABSTRACT

In a joint structure for coupling a first component (21) to a second component (22) in a joint portion of a fluid flow passage, the second component (22) has a portion thereof inserted into the first component (21) to engage with the first component (21). The second component (22) is provided with a flange portion (26), which is disposed adjacent to a bottom surface of the first component (21) and welded or bonded to the bottom surface, so that these components (22, 21) are coupled with each other in an easy and a fluid-tight manner in a condition in which they are prevented from rotating relative to each other without using any locking pin. There is no fear that the components (22, 21) dissolve in a fluid or gaseous material passing through the fluid flow passage. The joint structure is easy in maintenance.

3 Claims, 4 Drawing Sheets

JOINT STRUCTURE FOR COUPLING COMPONENTS IN A JOINT PORTION OF A FLUID FLOW PASSAGE

BACKGROUND OF THE INVENTION

1. Field of the Invention

The present invention relates to a joint structure for coupling a pair of components in a joint portion of a fluid flow passage such as a fluid transport pipe and the like for transporting a fluid or gaseous material therethrough, and more particularly to such a joint structure for coupling the pair of components of the fluid flow passage in its joint portion in a seal-tight manner.

2. Description of the Related Art

In a fluid flow passage such as a fluid transport pipe and the like for transporting a fluid or gaseous material such as industrial chemicals in liquid or gas form, various types of paint, medicines and the like, there are provided various types of valves such as check valves and the like. On the other hand, a fluid container or reservoir is provided with a connector through which the fluid stored in the reservoir is delivered to the outside. These valves and the connector have joint portions. In each of the joint portions, a pair of components of the fluid flow passage are coupled to each other. In coupling these components to each other, it is necessary to couple the components to each other in a seal-tight manner in order to prevent the fluid being transported through the fluid flow passage from leaking out of the passage between these components.

As shown in FIG. 5, the connector, which is mounted on the fluid reservoir in order to deliver the fluid stored in the reservoir to the outside, is constructed of, for example: a plug member 31 in which a fluid communication valve 32 is incorporated, wherein the fluid communication valve 32 is opened when pushed inwardly from the outside; and, a housing 33 for receiving the plug member 31 therein. On the other hand, a socket member is mounted on a front end portion of an external hose, and detachably coupled with the plug member 31. More specifically, the socket member is constructed of: an inner sleeve in which a fluid communication valve is incorporated, wherein the fluid communication valve is opened when pushed inwardly from the outside; and, an outer sleeve in which the inner sleeve is incorporated, wherein the outer sleeve of the socket member is inserted into the housing 33 of the connector when the socket member mounted on the front end portion of the external hose is coupled to the connector mounted on the reservoir, so that the above two of the communication valves are pushed inwardly in opposite directions relative to each other to open, whereby the fluid may flow from the reservoir to the external hose through the connector and the socket member.

More specifically, the plug member 31 has a construction in which: mounted in the plug member 31 in an insertion manner is each of a compression coil spring 34 and a sealing nut 35, wherein the compression coil spring 34 is supported by the sealing nut 35. On the other hand, a siphon tube 36 is disposed under the sealing nut 35 and clamped firmly between the sealing nut 35 and a stopper member 37. Embedded in an inner wall of the plug member 31 is an O-ring 38, which is brought into press-contact with an outer circumferential wall of the sealing nut 35 to prevent the fluid from leaking out of the fluid communication valves in the fluid flow passage when the connector of the fluid reservoir is coupled with the socket member of the external hose.

The connector described above is of a conventional type. In this case, the siphon tube 36 has its upper end portion firmly clamped between the stopper member 37 and the sealing nut 35 to prevent the fluid from leaking out of the fluid communication valves. However, when the siphon tube 36 is frequently subjected to lateral loads as viewed in FIG. 5, a clamping force exerted by both the stopper member 37 and the sealing nut 35 on the upper end portion of the siphon tube 36 gradually decreases to eventually permit the stopper member 37 to rotate and loosen, which permits the fluid to leak out of the fluid flow passage.

Further, since the conventional connector uses the O-ring 38 for sealing a clearance between the plug member 31 and the sealing nut 35, it is necessary for a user of the conventional connector to manage maintenance of the O-ring 38. Furthermore, when the fluid to be transported through the fluid flow passage is an industrial chemical, for example such as one which is used in a semiconductor manufacturing process and capable of dissolving a coating layer of the O-ring 38 in the industrial chemical, there is a fear that the O-ring 38 contaminates the fluid with its coating layer in the semiconductor manufacturing process.

FIG. 6 shows a conventional check valve, which is constructed of: a female-side body 41; a male-side body 42 capable of being threadably engaged with an inner wall of the female-side body 41; and, a compression coil spring 44 for constantly urging a disk 43, wherein the compression coil spring 44 is received inside the male-side body 42. In this conventional check valve, the female-side body 41 has an inner flow passage 45 in its bottom area. In operation, the disk 43 keeps the inner flow passage 45 of the check valve in a closed state unless a fluid pressure in the inner flow passage 45 is equal to or more than a predetermined value.

In this case, in order to prevent the fluid from leaking out of the flow passage, an O-ring 46 is mounted in a clearance between the female-side body 41 and the male-side body 42 in an insertion manner. Further, by means of a locking pin 47 extending from an outer peripheral surface of the female-side body 41 to the male-side body 42, the male-side body 42 is prevented from rotating relative to the female-side body 41. Due to this, the conventional check valve is disadvantageous in that a large number of parts are required in manufacturing the conventional check valve. This makes it cumbersome to assembly these many parts into the check valve.

Although there is a simple assembly method for coupling two components by using a screw, the screw often loosens in use and therefore causes leakage of the fluid. In order to prevent such leakage of the fluid, it is necessary to manage frequent maintenance of such a screw, for example such as a periodical fastening operation of the screw.

SUMMARY OF THE INVENTION

Under such circumstances, the present invention was made to solve the problems inherent in the prior art. Consequently, it is an object of the present invention to provide a joint structure for coupling a pair of components in a joint portion of a fluid flow passage such as a fluid transport pipe and the like for transporting a fluid or gaseous material therethrough, and more particularly to such a joint structure for coupling the pair of components of the fluid flow passage in its joint portion in an easy and a seal-tight manner without using any locking pin. The joint structure of the present invention is free from a fear that any part of the joint structure dissolves in the fluid to contaminate it. Further, the joint structure of the present invention is easy in maintenance.

In accordance with an aspect of the present invention, the above object of the present invention is accomplished by providing:

In a joint structure for coupling a first component (21) to a second component (22) of a fluid flow passage in a joint portion of the fluid flow passage by inserting a portion of the second component (22) into the first component (21), the improvement wherein:

the second component (22) is provided with a flange portion (26);

the flange portion (26) of the second component (22) is welded or bonded to a bottom surface of the first component (21);

whereby coupling of the components (21, 22) to each other is accomplished.

In the joint structure of the present invention having the above construction, preferably the second component (22) is provided with an annular edge portion (28) in its head surface; and, the first component (21) is provided with an annular groove (29) in its abutting portion which is brought into contact with the head surface of the second component (22), wherein the annular groove (29) of the first component (21) receives therein the annular edge portion (28) of the second component (22).

Further, preferably, coupling of the components (21, 22) to each other is accomplished by an ultrasonic welding process.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 4:
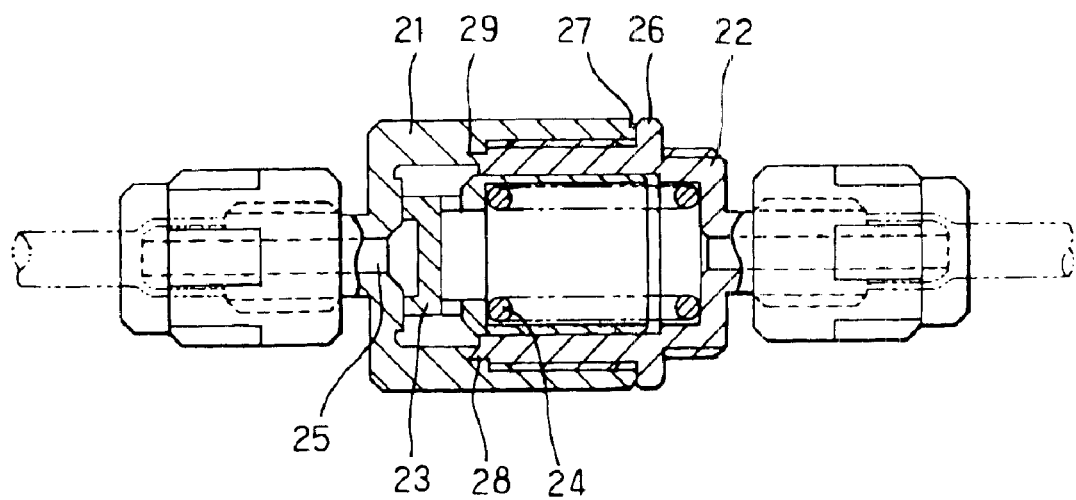
FIG. 4 is a longitudinal sectional view of a second embodiment of the joint structure of the present invention.
Figure 5:
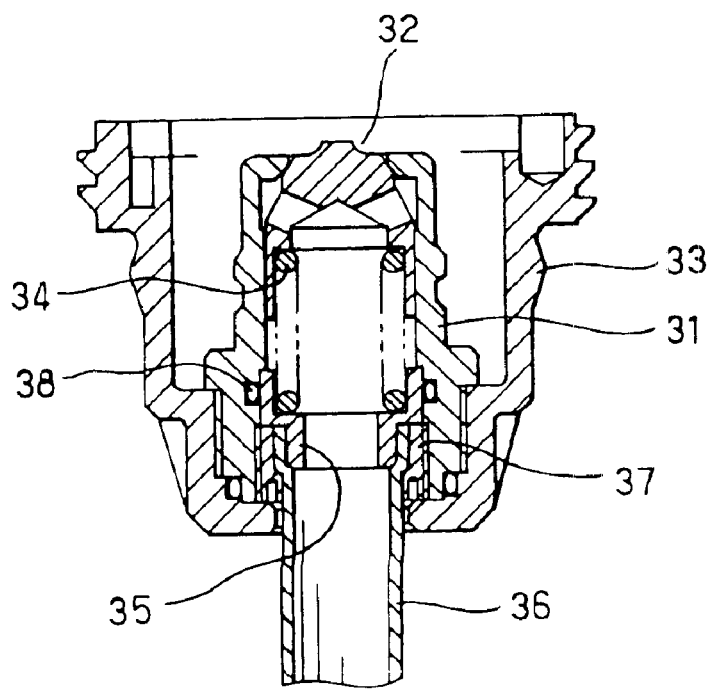
FIG. 5 is a longitudinal sectional view of a conventional connector, illustrating an example of the connector in construction.
Figure 6:
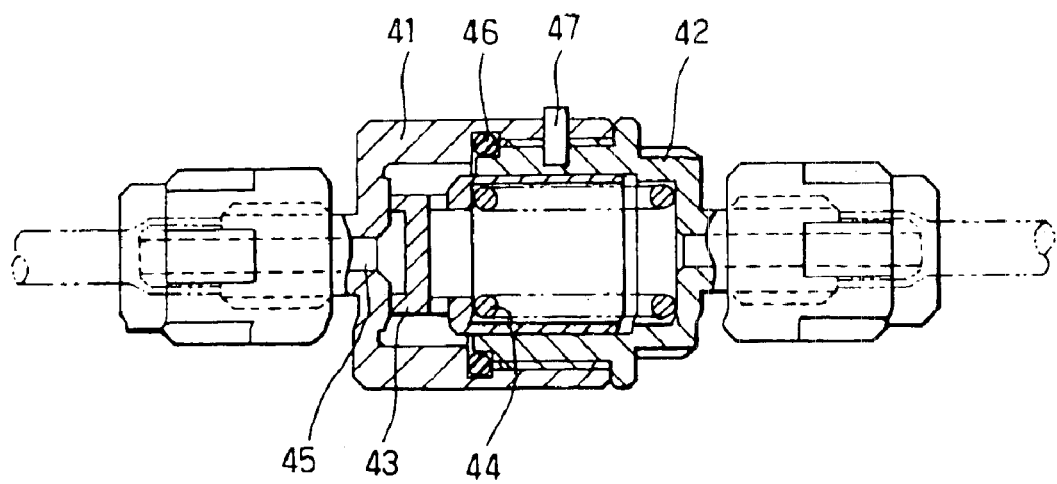
FIG. 6 is a longitudinal sectional view of a conventional check valve, illustrating an example of the conventional check valve in construction.

As shown in FIG. 4, a joint structure of a first embodiment of the present invention couples a first component 21 to a second component 22 of a fluid flow passage in a joint portion of the fluid flow passage by inserting a portion of the second component 22 into the first component 21. More specifically, the second component 22 is provided with a flange portion 26. The flange portion 26 of the second component 22 is welded or bonded to a bottom surface of the first component 21, so that coupling of these components 21, 22 to each other is accomplished.

Figure 1:
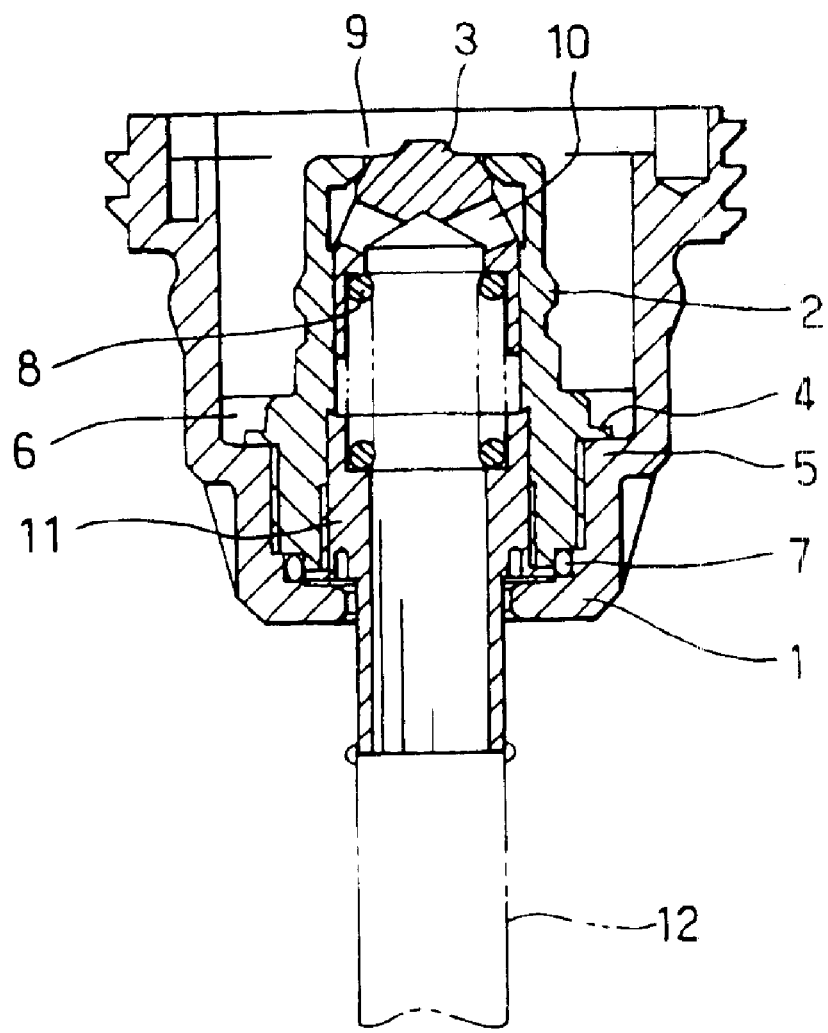
FIG. 1 is a longitudinal sectional view of a first embodiment of the joint structure of the present invention.

FIG. 1 shows a longitudinal sectional view of the first embodiment of the joint structure of the present invention, illustrating a connector mounted on a fluid container or reservoir employing the joint structure of the present invention. In the drawings: the reference numeral 1 denotes a housing fixedly mounted on a lid of the fluid reservoir. Received in the housing 1 is a plug member 2 in which a valve 3 is incorporated.

The plug member 2 is provided with a flange portion 4 in its intermediate portion. The flange portion 4 radially outwardly extends from an outer peripheral surface of the intermediate portion of the plug member 2. The plug member 2 is provided with a male screw portion in its lower portion under and adjacent to a lower surface of the flange portion 4. In assembly operations, the male screw portion of the plug member 2 is threadably engaged with a female screw portion of the housing 1, which female screw portion is formed in an inner wall of a lower portion of the housing 1. Consequently, after completion of the assembly operations, the flange portion 4 of the plug member 2 abuts against a shoulder portion 5 of the inner wall of the housing 1. An upper portion of the plug member 2 disposed above the flange portion 4 is firmly clamped by fastening a locking ring 6, so that the plug member 2 is prevented from rotating relative to the housing 1. An O-ring 7 is interposed between an inner bottom surface of the housing 1 and a bottom surface of the plug member 2 before the plug member 2 is threadably engaged with the female screw portion of the housing 1.

As viewed in FIG. 1, the valve 3 is constantly urged upwardly from the bottom of the valve 3 by a compression coil spring 8 to resiliently close an opening 9 of a front end portion of the plug member 2. The valve 3 is provided with a fluid communication port 10. In operation, when the valve 3 is pushed inwardly against a resilient force exerted by the compression coil spring 8 to open its front opening 9, the fluid may flow through the front opening 9 and then the fluid communication port 10 to enter the interior of the plug member 2, and then enter the interior of a socket member.

Figure 3:
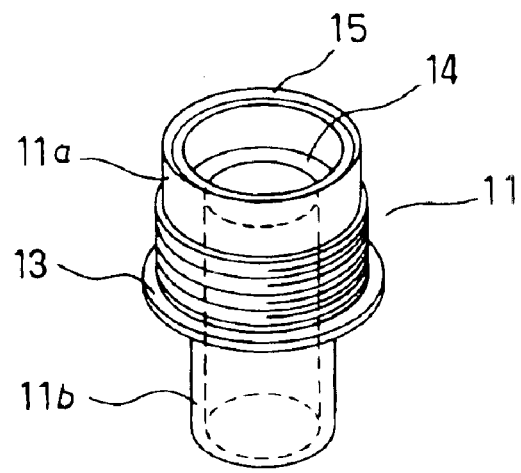
FIG. 3 is a perspective view of a stopper nut used in the first embodiment of the joint structure of the present invention shown in FIG. 1.

In FIG. 1, the reference numeral 11 denotes a stopper nut, which receives a lower surface of the compression coil spring 8 to project outward from a lower surface of the housing 1. The stopper nut 11 is connected with a siphon tube 12, which extends up to a bottom surface of the fluid reservoir. It is also possible to form the stopper nut integral with the siphon tube 12. The stopper nut 11 provided with: an upper half portion 11a, which is threadably engaged with a lower portion of the plug member 2; a lower half portion 11b, which is smaller in outer diameter than the upper half portion 11a and projects outward from the bottom of the housing 1; and, a flange portion 13 extending radially outwardly from an outer peripheral surface of an intermediate portion of the stopper nut 11, wherein the flange portion 13 is disposed between the upper half portion 11a and the lower half portion 11b (see FIG. 3).

Figure 2:
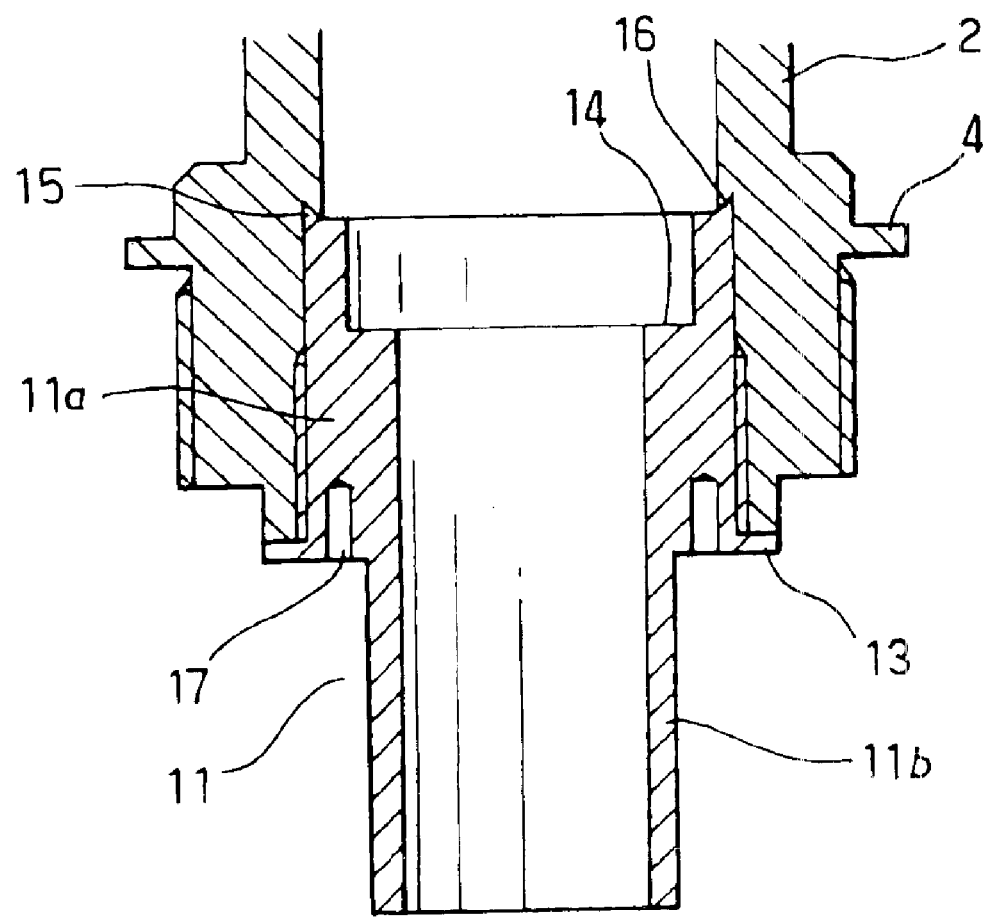
FIG. 2 is an enlarged longitudinal sectional view of an essential part of the joint structure of the first embodiment of the present invention shown in FIG. 1.

Formed in the upper half portion 11a of the stopper nut 11 is a spring seat 14 for receiving the lower surface of the compression coil spring 8. On the other hand, an upper end of the upper half portion 11b of the stopper nut 11 is formed into an annular edge portion 15 which assumes a top-pointed and wedge-shaped form in the longitudinal section of the stopper nut 11, as shown in FIG. 2. As for the plug member 2, the plug member 2 is provided with an annular receiving groove 16 for receiving the annular edge portion 15 of the stopper nut 11 therein. In FIG. 2, the reference numeral 17 denotes a tool engaging hole. A plurality of the tool engaging holes 17 are formed in a lower surface of the upper half portion 11a of the stopper nut 11, and detachably received therein a suitable tool or wrench which is used to threadably fasten the stopper nut 11 to the plug member 2.

In assembly operations, first of all, the stopper nut 11 is threadably engaged with the plug member 2 after both the valve 3 and the compression coil spring 8 are mounted in the plug member 2. In fastening the stopper nut 11 as described above, the tool engaging holes 17 of the stopper nut 11 receives the wrench therein so that the stopper nut 11 is turned relative to the plug member 2 by the wrench. By tightly fastening the stopper nut 11, it is possible to have the annular edge portion 15 closely fitted to the annular receiving groove 16 of the plug member 2 in an insertion manner. Such a closely fitting state of the annular edge portion 15 to the annular receiving groove 16 provides oil seal means. On the other hand, the lower surface of the spring 8 abuts against the spring receiving seat 14 of the stopper nut 11 and is received therein.

As described above, when the plug member 2 is threadably connected with the stopper nut 11, the flange portion 13 of the stopper nut 11 is brought into close contact with a lower surface of the plug member 2 in an abutting manner and welded or bonded thereto integrally. In other words, the stopper nut 11 is integrated into the plug member 2 by a welding process or a bonding process, which makes it impossible to turn the stopper nut 11 relative to the plug member 2 and provides a fluid-tight sealing structure.

As is clear from FIG. 1, the plug member 2, to which the stopper nut 11 is fastened, is inserted into the housing 1 from above to project the lower half portion 11b downward from the opening of the bottom surface of the housing 1. At this time, the O-ring 7 is interposed between the plug member 2 and the inner wall of the housing 1. Then, the male screw portion of the plug member 2 disposed under the flange portion 4 is threadably engaged with the female screw portion of the housing 1, so that the plug member 2 is firmly fixed to the housing 1. When the siphon tube 12 is not integrally formed with the stopper nut 11, the siphon tube 12 is connected to the lower half portion 11b of the stopper nut 11, as already described above.

FIG. 4 shows a longitudinal sectional view of a second embodiment of the joint structure of the present invention, illustrating a check valve provided with the joint structure of the present invention. This check valve is constructed of: a female-side body 21; a male-side body 22 threadably engaged with the female-side body 21; and, a compression coil spring 24 which is received inside the male-side body 22 to constantly and resiliently urge a disk 23. In operation, the disk 23 keeps a fluid flow passage 25 of the check valve in a closed state unless a fluid pressure in the fluid received in the passage 25 is equal to or more than a predetermined value.

Formed in the male-side body 22 is a flange portion 26, which abuts against an end surface 27 of the female-side body 21 when these bodies 22, 21 are coupled to each other. The entire peripheral areas of the abutting portions 26, 27 of the bodies 22, 21 are welded to each other in a seal-tight manner by an ultrasonic welding process, for example. Consequently, thus welded bodies 22, 21 are entirely integrated, so that the abutting portions 26, 27 of the bodies 22, 21 are free from any leakage of the fluid.

Further, the male-side body 22 is provided with an annular edge portion 28 in a front end surface thereof. On the other hand, the female-side body 21 is provided with an annular groove 29 in its inner wall. The annular groove 29 of the female-side body 21 is brought into close contact with the corresponding annular edge portion 28 of the male-side body 22 in an insertion manner when these bodies 21, 22 are coupled to each other. Due to this, the thus coupled bodies 21, 22 are free from any leakage of the fluid.

As described above, since the joint structure of the present invention such as that of the bodies 21, 22 is double-sealed in their coupling portions, i.e., in each of the abutting portion of the flange portion 26 of the male-side body 22 and the inserted portion of the annular edge portion 28 of the female-side body 21 without using any O-ring, it is possible for the joint structure of the present invention to enjoy a perfectly fluid-tight sealing property. Further, both the bodies 21, 22 are integrated in their abutting portions, it is possible for these bodies 21, 22 to prevent one of the bodies 21, 22 from rotating relative to the other without using any locking pin.

Since the joint structure of the present invention for coupling the components of the fluid flow passage in the joint portion of the flow passage has the above construction, it is possible for the joint structure of the present invention to couple the components of the flow passage with each other in an easy manner in a condition in which the fluid flow passage is properly sealed to establish a fluid-tight connection between these components, so that the liquid and/or gaseous material is transferred safely though the fluid flow passage. Further, it is possible for the joint structure of the present invention to prevent one of the components of the fluid flow passage from rotating relative to the other without using any locking pin in the joint structure. In the joint structure of the present invention, there is no fear that the components of the fluid flow passage dissolve in the liquid and/or gaseous material flowing through the fluid flow passage. Further, the joint structure of the present invention is easy in maintenance, and requires little maintenance.

Finally, the present application claims the Foreign Priority based on Japanese Patent Application No. 2001-336607 filed on Nov. 11, 2001, which is herein incorporated by reference.

What is claimed is:

1. In a joint structure for coupling a first component (21) to a second component (22) of a fluid flow passage by inserting a portion of said second component (22) into said first component (21), wherein said second component is formed as a single unit, the improvement wherein:

said second component (22) is provided with an annular flange portion (26) having a side and an annular edge portion (28) having a v-shaped cross-section on an end thereof;

said side of said annular flange portion (26) of said second component (22) abutting an annular end surface of said first component (21) which is parallel to said side after the second component and first component are coaxially engaged, said side and said annular end surface being welded together to create a first seal;

said annular edge portion (28) of said second component (22) being brought into abutting contact with a corresponding annular portion of said first component (21) to form a complete second seal between and around said annular edge portion on said second component and said corresponding annular portion of said first component;

whereby coupling of said components (21, 22) to each other is accomplished to create a double-seal comprising said first seal and said second seal in the joint structure.

2. The joint structure for coupling the components (21, 22) of the fluid flow passage to each other as set forth in claim 1, wherein: said corresponding annular portion of first component (21) comprises an annular groove (29) having a V-shaped cross-section corresponding to that of the annular edge portion on the second component, wherein said annular groove (29) of said first component (21) receives therein said annular edge portion (28) of said second component (22).

3. The joint structure for coupling with components (21, 22) of the fluid flow passage to each other as set forth in claim 1, wherein an ultrasonic welding process is used to weld together said side of said annular flange portion of said second component and said annular end surface of said first component.

* * * * *